United States Patent [19]

Zimmermann et al.

[11] 4,166,033

[45] Aug. 28, 1979

[54] PROCESS FOR THE SEPARATION OF POLYVINYL ALCOHOL FROM AQUEOUS SOLUTIONS

[75] Inventors: Wolfgang Zimmermann, Kelkheim; Hermann Schindler, Hofheim am Taunus, both of Fed. Rep. of Germany

[73] Assignee: Hoechst Aktiengesellschaft, Frankfurt am Main, Fed. Rep. of Germany

[21] Appl. No.: 867,141

[22] Filed: Jan. 5, 1978

[30] Foreign Application Priority Data

Jan. 7, 1977 [DE] Fed. Rep. of Germany ....... 2700361

[51] Int. Cl.$^2$ ........................... C02B 1/18; C02C 5/02
[52] U.S. Cl. ........................................ 210/51; 210/53
[58] Field of Search ................................... 210/51–53, 210/47

[56] References Cited

U.S. PATENT DOCUMENTS

| | | | |
|---|---|---|---|
| 3,761,406 | 9/1973 | Tsuk | 210/52 |
| 4,066,541 | 1/1978 | Sando et al. | 210/53 X |

*Primary Examiner*—Thomas G. Wyse
*Attorney, Agent, or Firm*—Curtis, Morris & Safford

[57] ABSTRACT

In order to protect the environment from pollution, it is desirable to keep the polyvinyl alcohol content in waste waters as low as possible. Polyvinyl alcohol may be removed from waste waters by means of microorganisms on the the one hand, and on the other according to chemical/mechanical methods by salting-out and precipitation and subsequent separation of the solids. Advantageous is the precipitation in the form of a polyvinyl alcohol/boric acid/didiol complex, especially by means of alkaline earth metal hydroxides in an alkaline medium. Calcium hydroxide is a particularly suitable alkaline earth metal hydroxide.

5 Claims, No Drawings

PROCESS FOR THE SEPARATION OF POLYVINYL ALCOHOL FROM AQUEOUS SOLUTIONS

Polyvinyl alcohol (PVAL) is generally used in the form of aqueous solutions thereof. Because of its high water-solubility, sooner or later it will be found in the waste water, especially in the case where it is employed in the textile industry as sizing agent or starting substance for the preparation of sizing agents. For, the PVAL layer being on the fiber after weaving must be removed by washing, so that it is incorporated in quantitative amounts into the waste water.

Although PVAL has no noxious effect on either plants or animals, it increases the chemical oxygen demand (COD) and the biological oxygen demand (BOD) of the waste water, and thus causes an undesirable environmental strain. Therefore, the PVAL content of the waste water should be kept as low as possible.

Although it is known that certain adapted microorganisms, for example pseudomonas, are capable of degrading PVAL in the biological phase of a sewage purification plant, they refuse to do so when their concentration is relatively low, as is the case in normal water courses. Since furthermore factories using PVAL are seldom equipped with sewage purification plants having a biological degradation phase, it is necessary to develop processes for separating PVAL from aqueous solutions, in order to keep the sewage system as free as possible from polution.

Removal of PVAL from aqueous solutions by salting-out and subsequent sedimentation and filtration has been described already, and the addition of alkali metal hydroxides and alkaline earth metal hydroxides for this purpose has heretofore been proposed. Furthermore, it has been proposed to separate polyvinyl alcohol from aqueous solutions by adding to the solutions a coagulation agent which consists of a salt of boric acid as gelation agent and an alkali metal salt or alkaline earth metal salt of an organic acid as salting-out agent (see German Offenlegungsschrift No. 2,557,443). These processes, however, have the disadvantage of requiring generally a high concentration of salt, which makes them very uneconomic; moreover, a quantitative removal of the PVAL cannot be obtained by this method. There are furthermore technological difficulties, since the precipitate is in the form of a gel and thus is difficult to separate. Finally, the processes described allow flocculation only in the case of high PVAL concentration.

It has now been found that the cited disadvantages can be overcome when the precipitation of PVAL is carried out in the form of a PVAL/boric acid/didiol complex.

The present invention relates to a process for the separation of polyvinyl alcohol from an aqueous solution by precipitation of the polyvinyl alcohol in the presence of orthoborate ions and alkaline earth metal ions, in an alkaline medium, which comprises either adding first a saturated boric acid solution to the polyvinyl alcohol solution and then adjusting the latter one to a pH above 8 by means of an alkaline earth metal hydroxide solution; or adjusting first the polyvinyl alcohol solution to a pH of 11 by adding an alkaline earth metal hydroxide solution and then adding a boric acid solution neutralized by an alkaline earth metal hydroxide; and subsequently separating the precipitated polyvinyl alcohol.

It has been described that boric acid forms complexes in an alkaline medium. For example, Deuel and Neukom, Makromolekulare Chemie No. 3 (1949), p. 137, state that by addition of an alkaline earth metal hydroxide solution or direct treatment of a PVAL solution with borax, the PVAL/boric acid/monodiol complex is converted to a PVAL/boric acid/didiol complex according to the following reaction scheme:

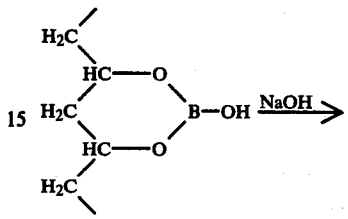

monodiol type

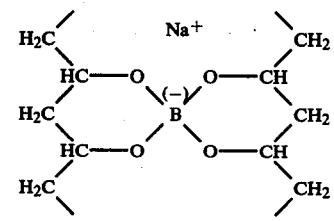

didiol type

In such a PVAL/boric acid/didiol complex, at least 2 PVAL chains are linked with each other via a boron atom to form a very stable six-membered ring configuration.

Simultaneously with the formation of such a complex, an increase of the viscosity of the PVAL solution is observed which depends on the concentration: highly concentrated PVAL solutions gelatinize, while the consistency of dilute solutions, for example waste water containing less than 1% of PVAL, is practically not altered. However, separation of PVAL from aqueous solutions by formation of these didiol complexes could not be obtained hitherto.

Surprisingly, it has now been observed that such PVAL/boric acid/didiol complexes, in the presence of alkaline earth metal ions, form polysalts which are soluble with extreme difficulty only and which are excellently suitable for an economic separation of the PVAL even from highly dilute solutions. These polysalts are obtained in a form easy to sediment and to be filtered and they cause a nearly quantitative precipitation of the PVAL/boric acid/didiol complex. Maintaining a pH above 8 and the use of the borate ion in the form of the orthoborate ion, however, are absolutely required for the formation of such polysalts. The commercial calcium borate $Ca(BO_2) \cdot nH_2O$ is unfit for the process of the invention, because it is a polymeric metaborate not containing any orthoborate ions which only are capable of forming complexes with PVAL.

In principle, the PVAL/boric acid/didiol complex forms difficultly soluble polysalts with all alkaline earth metal ions; calcium ions, however, being preferred.

For the process according to the invention for separating PVAL in the form of alkaline earth metal salt of the PVAL/boric acid/didiol complex, there are suitable the following three technologically simple operation modes:

(1) The PVAL solution is adjusted to pH 11 by means of an alkaline earth metal hydroxide, and an aqueous boric acid solution neutralized with alkaline earth metal hydroxide is then added to this solution.

(2) A saturated aqueous boric acid solution is added to the PVAL solution, which is then adjusted to a pH above 8 by means of alkaline earth metal hydroxide.

(3) A saturated boric acid solution is added to the PVAL solution which is then rendered alkaline by means of alkali metal hydroxide, and subsequently, the didiol complex is precipitated by adding water-soluble alkaline earth metal salts, for example calcium chloride. Of course, alternatively, the calcium chloride may be added first and the precipitation with alkali metal hydroxide may be carried out subsequently.

According to all these operation modes, PVAL precipitates are obtained which settle very rapidly in the aqueous solution and which can be easily separated by filtration or decantation.

The stoichiometric composition of the precipitate varies according to the given concentration ratio of PVAL/alkaline earth metal to borate.

Probably, there are simultaneously condensation reactions of the orthoborate ion, so that a precise stoichiometric formula cannot be indicated for the precipitate formed.

A further advantage of the process of the invention resides in the fact that the complex PVAL/boric acid precipitate can be easily dissolved again by a mineral acid the alkaline earth metal salt of which is not difficultly soluble, so that PVAL solutions of relatively high concentration can be obtained from highly dilute PVAL solutions, and the totality of ions within such highly concentrated PVAL solutions may then be removed by dialysis. The remaining polyvinyl alcohol solution is thus at disposal for reuse. Suitable mineral acids are preferably hydrochloric or nitric acid.

In order to keep the amount of waste water within reasonable limits when applying the process of the invention on an industrial scale, the supernatant clear solution remaining after precipitation of the PVAL, or the filtrate, is reused for dissolving the boric acid or the alkaline earth metal hydroxide.

The efficiency or the degree of purification of the process of the invention is advantageously determined by calculating the chemical oxygen demand (COD) according to the method of ASTM D 1252-58 T on the basis of the following equation:

$$100 - \frac{COD_{purified\ solution}}{COD_{original\ solution}} \cdot 100 = \%\ \text{of efficiency or degree of purification}$$

By PVAL in accordance with this invention, there is to be understood a completely or partially saponified PVAL which has a viscosity of from 3 to 200 mPas (millipascalsecond) in a 4% aqueous solution, and an ester number of from 0 to 400 mg KOH/g.

The concentration of the PVAL solutions to be treated in accordance with this invention may be in principle in all ranges which occur in the industrial processing of PVAL. However, the PVAL concentration is preferably in a range which is normal for waste waters, that is, from 0.001 to 2% by weight of PVAL.

As alkaline earth metal hydroxide solutions, there are used saturated aqueous solutions, preferably solutions of calcium hydroxide.

The amount of precipitating agents to be added depends in each case on the amount of PVAL which is to be removed from the respective aqueous solution. A sufficient amount of precipitating agent has been added when there is no blue coloration any more of the iodine/boric acid test solution, which test is described as follows:

Some drops of boric acid solution and one drop of iodine solution are added to some drops of the solution to be tested, advantageously in a manner as is usual for spot analysis. In the case where the solution to be tested contains more than 0.001% by weight of PVAL, a blue coloration occurs. This detection method gives reliable results, independently of the degree of saponification and the viscosity of the PVAL.

Generally, in accordance with the present invention the boric acid solution as well as, especially, the calcium hydroxide solution will be used in a slight excess.

In the following Examples 1 to 11, PVAL solutions of 1.0 or 0.1% strength are treated according to this invention, and the influence of chain length (viscosity) and ester number is tested. The efficiency of the separation is generally higher than 95%, with the exception of a PVAL type having an extremely low viscosity and a high ester number.

Examples 12 to 14 show that the addition of a high excess of precipitating agent to the PVAL solution does not result in an increased efficiency.

Examples 15 and 16 indicate further advantageous operation modes of the process of the invention.

Examples 17 to 23 prove that PVAL, especially in a highly dilute solution down to a concentration of 0.01% by weight, may be precipitated with an efficiency of more than 98% in a technologically interesting manner.

The basic principle of the process of the invention may be used inversely too; that is, it allows the removal of borate ions from alkali metal borate solutions by means of PVAL solutions and calcium hydroxide.

In the following Examples, parts and percentages are by weight unless otherwise stated.

EXAMPLE 1

100 Parts of a 1.0% solution of a PVAL, the 4% aqueous solution of which has a viscosity of 4 mPas and which has an ester number of 140 mg KOH/g, are adjusted to pH 12 by addition of 0.5 part of calcium hydroxide. Subsequently, 250 parts of a precipitating solution prepared by neutralization of 45 parts of boric acid and 5 parts of calcium hydroxide in 100 parts of water are added slowly with agitation. On this dropwise addition of the precipitation agent, the mixture becomes turbid at first, and after about 5 minutes after addition of the total precipitating solution, a precipitate forms which settles well. The COD value of the 1% starting solution is 19,500 mg $O_2$/l. The filtrate of the solution so treated has a COD value of 650 mg $O_2$/l, the dilution of the PVAL solution by the inorganic precipitating agent being already considered in the calculation. The efficiency or degree of purification of this reaction is $$100 - \frac{COD,\ \text{purified soln.}}{COD,\ \text{starting soln.}} \cdot 100 =$$

$$100 - \frac{650 \cdot 100}{19,500} = \text{about 97\%}$$

EXAMPLE 2

According to Example 1, a 1% solution of a PVAL having a viscosity of 4 mPas and an ester number of 20 mg KOH/g is purified.
Result:
COD, original soln. = 20,000 mg $O_2$/l
COD, purified soln. (corrected) = 260 mg $O_2$/l
This means that a purification degree of about 99% is obtained.

EXAMPLE 3

A 1.0% aqueous solution of a PVAL, the 4% aqueous solution of which has a viscosity of 26 mPas and which has an ester number of 140 mg KOH/g, is treated according to Example 1.
Result:
COD, original soln. = 20,100 mg $O_2$/l
COD, purified soln. (corrected) = 175 mg $O_2$/l
This means that a purification degree of more than 99% is obtained.

EXAMPLE 4

A 1.0% solution of a PVAL, the 4% aqueous solution of which has a viscosity of 28 mPas and which has an ester number of 8 mg KOH/g, is treated according to Example 1.
Result:
COD, original soln. = 18,500 mg $O_2$/l
COD, purified soln. (corrected) = 140 mg $O_2$/l
This means that a purification degree of more than 99% is obtained.

EXAMPLES 5 to 11

According to the method indicated in Example 1, 250 parts each of 0.1% aqueous solutions of different polyvinyl alcohol types the viscosity of the 4% aqueous solution of which is determined (column A) as well as their ester number (column B) are adjusted first to pH 12 by means of 0.5 part of calcium hydroxide, and subsequently treated with 75 parts each of the precipitating solution (saturated boric acid, neutralized with calcium hydroxide solution). The precipitates obtained are filtered off, and the COD value is determined on the clear filtrate while considering the dilution by the precipitating solution in the calculation (column D), as compared to the COD of the starting PVAL solution (column C). According to the equation as cited above, the efficiency or purification degree (column E) of the invention is calculated as follows:

| Example No. | A(mPas) | PVAL-type B(mgKOH/g) | C(mg $O_2$/l) | D(mg $O_2$/l) | E(%) |
| --- | --- | --- | --- | --- | --- |
| 5 | 3 | 190 | 1,915 | 310 | 84 |
| 6 | 4 | 140 | 1,950 | 98 | 95 |
| 7 | 4 | 20 | 2,000 | 20 | 99 |
| 8 | 18 | 140 | 1,900 | 38 | 98 |
| 9 | 20 | 20 | 2,010 | 20 | 99 |
| 10 | 26 | 140 | 2,010 | 60 | 97 |
| 11 | 28 | 8 | 1,850 | 19 | 99 |

EXAMPLES 12 to 14

These examples show the influence of the amount of precipitating solution, relative to 250 parts of a 0.1% aqueous solution of a PVAL, the 4% aqueous solution of which has a viscosity of 18 mPas and which has an ester number of 140 mg KOH/g. The COD of the starting solution is 1,900 mg $O_2$/l. After adjustment of the PVAL solution to pH 12 by means of 0.5 part of calcium hydroxide, 62.5 parts, 75 parts and 100 parts, repectively, of the above precipitating solution are added.

| Example No. | Precipitating solution parts b. wt. | COD of the filtrate, corrected | degree of purification (%) |
| --- | --- | --- | --- |
| 12 | 62.5 | 40 | 98 |
| 13 | 75 | 38 | 98 |
| 14 | 100 | 17 | 99 |

In this case, 60 parts of precipitating solution would have been the minimum amount required for the PVAL type used and the concentration thereof. A smaller amount of precipitating solution results in turbidity of the solution only, and, after prolonged standing time, a lower purification degree. The same phenomenon is oberserved when an insufficient amount of calcium hydroxide is added.

EXAMPLE 15

50 Parts of saturated boric acid and 20 parts of 20% calcium chloride solution are added one after the other with agitation to 250 parts of a 0.1% aqueous PVAL solution of the type as described in Example 8. Subsequently, the mixture is adjusted to pH 9 by means of 2 N sodium hydroxide solution, which causes the PVAL complex to precipitate.
Result:
COD of the starting solution—1,900 mg $O_2$/l
COD of the purified filtered solution, corrected, corresponding to a purification degree of 93%—130 mg $O_2$/l

EXAMPLE 16

60 Parts of saturated boric acid solution are added to 250 parts of a 0.1% PVAL solution of the type as described in Example 8, and the mixture is subsequently adjusted slowly to pH 9 by adding a filtered, saturated calcium hydroxide solution. This causes the PVAL complex to precipitate in a form that is easy to be filtered. Instead of filtered calcium hydroxide solution, a suspension of milk of lime may be used in the industrial practice.
Result:
COD of starting solution—1,900 mg $O_2$/l
COD of filtrate, corrected corresponding to 94% purification degree—120 mg $O_2$/l

EXAMPLES 17 to 23

Purification of PVAL solutions in highly dilute state.
According to the method as indicated in Example 1, 0.5 part each of calcium hydroxide is added to 250 parts each of 0.01% aqueous solutions of different types of PVAL, the viscosity of a 4% aqueous solution of which is determined (column A) as well as their ester number (column B), so that a pH of 12 is adjusted, and subsequently the solutions are treated with 75 parts each of the precipitating solution consisting of saturated boric acid neutralized with calcium hydroxide, as indicated in Example 1. The filtrate of the precipitate of the PVAL complex formed which can be easily filtered has a corrected COD value (column D) as compared to the COD of the starting solution (column C). The purification degree of the solution so treated is listed in column E of the following Table.

| Example No. | A (mPas) | B (mg KOH/g) | C (mg O$_2$/l) | D (mg O$_2$/l) corrected | E (%) |
| --- | --- | --- | --- | --- | --- |
| 17 | 3 | 190 | 190 | 4 | about 98 |
| 18 | 4 | 140 | 195 | 2 | about 99 |
| 19 | 18 | 140 | 190 | about 1 | about 99 |
| 20 | 26 | 140 | 200 | about 1 | about 99 |
| 21 | 4 | 20 | 200 | 1 | 100 |
| 22 | 20 | 20 | 205 | 1 | 100 |
| 23 | 28 | 5 | 185 | 1 | 100 |

What is claimed is:

1. A process for the separation of polyvinyl alcohol from waste water containing the same which comprises adjusting the pH of said waste water to a value of at least 11 by addition thereto of calcium hydroxide, precipitating a polyvinyl alcohol/boric acid/didiol complex from said waste water by adding thereto aqueous boric acid that has been pre-neutralized with calcium hydroxide, and separating the precipitated complex from the waste water.

2. The process as claimed in claim 1, which comprises using a saturated solution as alkaline earth metal hydroxide solution.

3. The process as claimed in claim 1, which comprises using calcium hydroxide as alkaline earth metal hydroxide.

4. A process for the separation of polyvinyl alcohol from an aqueous solution thereof which comprises making said solution alkaline by addition of an alkaline earth metal hydroxide thereto, precipitating a polyvinyl alcohol/boric acid/didiol complex from said solution by adding thereto aqueous boric acid that has been pre-neutralized with alkaline earth metal hydroxide and separating the precipitated complex from the solution.

5. A process according to claim 4 wherein said solution is made alkaline to a pH of at least 8.

* * * * *